Patented Mar. 12, 1946

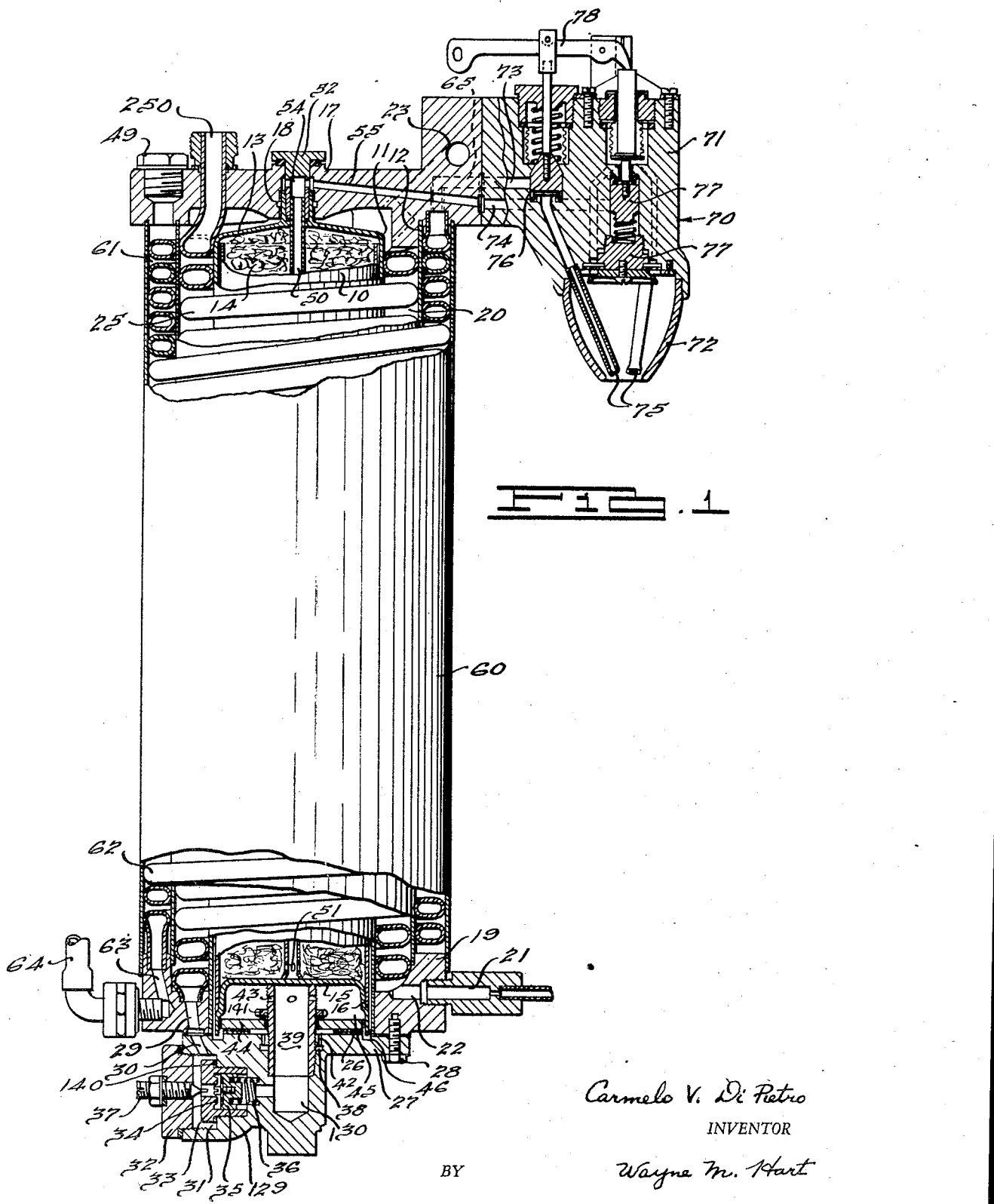

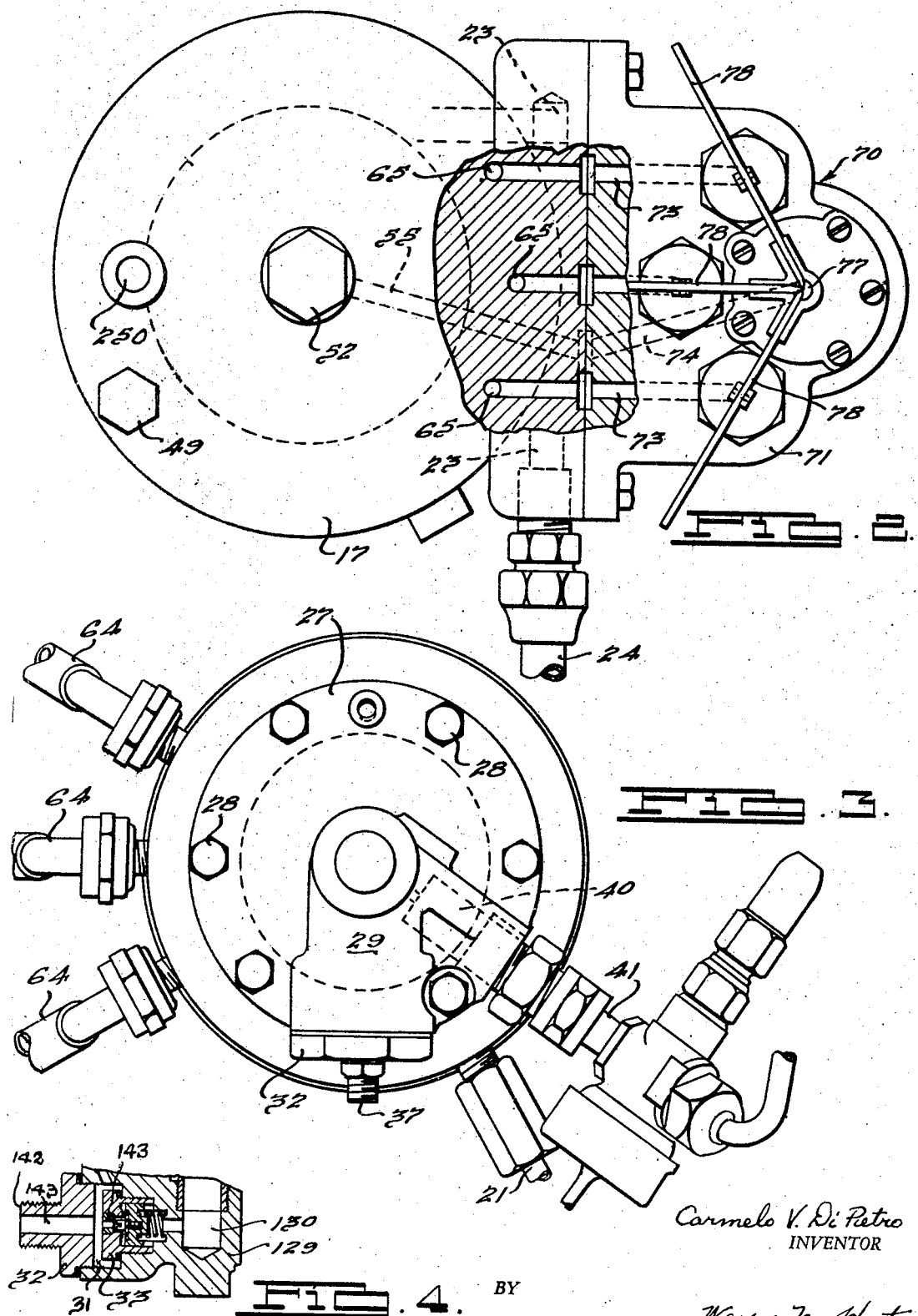

2,396,460

UNITED STATES PATENT OFFICE 2,396,460

COOLING APPARATUS

Carmelo V. Di Pietro, Birmingham, Mich.

Application January 8, 1943, Serial No. 471,784

3 Claims. (Cl. 62—141)

This invention relates to beverage cooling apparatus.

An object of the invention is to provide a compact, unitary structure in which water and carbon dioxide gas are mixed and dispensed with syrup from a faucet, the carbonated water and syrup being refrigerated in the structure and the faucet being cooled by thermal contact with the structure.

Another object of the invention resides in providing a refrigerated carbonator structure in which syrup conduits are housed and refrigerated.

Another object of the invention resides in providing a refrigerated carbonator structure within the confines of which the water is first refrigerated and then mixed with carbon dioxide gas.

Another object of the invention is to provide a refrigerated carbonator header to which a beverage dispensing faucet is fixed in thermal contact so that the temperature of the beverage flowing from the faucet will be maintained at a desired low temperature.

These and other objects of the invention will appear from the following description taken in connection with the drawings, which form a part of the specification, and in which:

Fig. 1 is a side elevational view of a beverage dispensing apparatus partly broken away to show various interior parts.

Fig. 2 is a top plan view of the apparatus partly broken away to show portions of the syrup passages leading into the faucet.

Fig. 3 is a view looking at the bottom of the apparatus showing the refrigerant inlet, the gas inlet and the syrup inlets.

Fig. 4 is a fragmentary sectional view of a modified form of the invention showing a drinking water outlet leading from the structure.

Referring now to the drawings by characters of reference, the beverage dispensing apparatus includes a carbonator and reference may be had to my pending applications Serial No. 289,934 filed August 14, 1939, and Serial No. 467,547 filed December 1, 1942, as showing certain features of the carbonator including sources of water, carbon dioxide gas and syrup and a refrigerating system referred to herein.

The carbonator consists generally of a device for metering and mixing carbon dioxide gas and water and a storage chamber for such mixture. Three shells 10, 11 and 12 are arranged in spaced, telescoped relation and are substantially coextensive. Shell 10 is open at the top, is spaced below the top wall 13 of shell 11 and is substantially filled with material 14, such as a mass of stainless steel wool. Shell 10 has a bottom wall 15 from which an annular flange 16 depends. Shell 10 forms a storage chamber for carbonated water and the steel wool therein is in thermal contact with the shell so that it helps to maintain a low temperature in the carbonator and the steel wool is of such small mesh that bubbles of gas that are not readily dissolved cannot pass upwardly to collect in pockets.

A header 17 extends over the shells and has recesses therein to receive the upper ends of shells 11 and 12 and neck 18 projecting from wall 13. The lower ends of shells 11 and 12 are sealed to a bottom ring member 19. The header and the ring member close the space between shells 11 and 12 to form a refrigerant chamber 20 that can be connected with a conventional mechanical refrigerating system by inlet conduit 21 and passage 22 in the ring member. The upper end of the chamber 20 communicates with an angular passage 23 in the header and a return conduit 24 is connected to the header in communication with such passage. A coiled tube 25 is arranged in the refrigerant chamber 20 and the inlet end 250 projects through the header for connection with a source of water under pressure.

The metering and mixing device for water and gas is located beneath the bottom of the storage chamber and includes a chamber 26 formed by the bottom wall 15 of shell 10, its flange 16 and a cover plate member 27, such plate member being secured against the ring member by bolts 28. This plate member lies under shells 10 and 11 and partially underlies the refrigerant chamber. The lower end of the water tube 25 is sealed in a passage 29 in the ring member and such passage is open to passage 30 in the plate member. The plate member is formed with a depending boss 129 and a vertical recess 130 therein opens into chamber 26 and is connected with another recess 31 in the boss. The outer end of recess 31 is closed by a screw plug 32. Water passage 30 opens into recess 31 and a valve structure is arranged in recess 31 between passage 30 and recess 130. A drilled plug 33 is screwed in recess 31 and has a lip 34 forming a seat for valve 35 that is normally closed by spring 36 and by interior pressure in the surrounding recess. The position of plug 33 in the recess controls the pressure exerted by the spring against the valve and the plug position can be regulated by the thickness of gasket 140. A regulator 37 is screwed through the plug 32 to control water flow through screw plug 33.

A portion of recess 130 in the plate member is enlarged to form a gas chamber 38 that is isolated from the rest of the recess by a threaded tube 39 screwed into the plate member and the boss. The top of the tube engages the bottom wall 15 and supports the storage shell 10. The boss is drilled to form passage 40 leading to chamber 38 and connected by conduit 41 with a source of carbon dioxide gas. A plurality of passages 42 are drilled in the plate member through which gas can flow from chamber 38 to the lower portion of chamber 26. Tube 39 has holes 43 therein through which water flows into the upper portion of chamber 26.

Metering and mixing means are provided for the water and gas flowing into chamber 26. A partition disk 44 is arranged on tube 39 and nut 141 is screwed on the tube to hold the disk clamped against rings 45 stacked on the top of the plate member. The disk divides the chamber 26 into an upper water receiving portion and a lower gas receiving portion. The peripheral face of the disk is knurled or grooved and fits against the inner wall of the depending flange 16 to form multiple passages through which small streams of water in a violent state of agitation intermingle and flow downwardly past the carbon dioxide metering rings. The rings have one or more of their abutting faces formed with radially extending grooves through which gas flows outwardly in a plurality of minute streams into the swirling water leaving the disk. Flange 16 extends into a groove 46 in the top face of the plate member, but is spaced above the bottom of the groove so that the mixture of water and gas can flow thereunder into the space between the shells 10 and 11. The mixture flows upwardly in violent agitation between the shells 10 and 11 and passes into the storage chamber. The carbonated water must pass downwardly through the storage chamber because the outlet tube 50 extends the full length of the chamber and is closed in the chamber except for openings 51 near its lower end.

The upper end of tube 50 extends into neck 18 and is closed by a threaded plug 52 screwed against a rubber washer in the neck 18. This plug is formed with passage means 54 communicating with an outlet passage 55 in the header.

Syrup supply means form a part of the unitary dispensing apparatus and, to this end, a shell 60 is spaced from and surrounds shell 12. Shell 60 is spaced from shell 12 and is sealed at its ends in the header 17 and bottom ring member 19 to form a closed chamber 61. Coiled syrup tubes 62 are arranged in chamber 61 with the lower ends connected with passages 63 in ring member 19, such passages being connected with conduits 64 leading from sources from which syrup or other liquids such as fruit juices, flow by gravity or under pressure. The upper ends of the syrup tubes connect with outlet passages 65 in the header. Chamber 61 can be filled with a suitable fluid for influencing the temperature of syrup flowing through the chamber. Plug 49 being removable from the header for filling and draining the chamber.

It will be noted that the carbonator and the syrup supply means form a compact, unitary structure through which refrigerant flows to maintain a substantially uniform low temperature through heat transfer and the thermal contact of the related parts. Water flowing into the structure is entirely enclosed in refrigerated condition without exposure to outside atmosphere until it is dispensed as carbonated water. By arranging the syrup chamber around the exterior of the carbonator, there will be a lower heat loss from the refrigerant chamber. Also, the syrup temperature will be kept high enough to flow properly but low enough so that it will not expel carbon dioxide gas from the water when drawn from the faucet and will not raise the temperature of the dispensed beverage.

A faucet structure 70 is suitably fixed in thermal contact with the header 17 and forms a part of the unitary structure. The faucet structure body 71 has a nozzle 72 screwed thereon and a flat side wall that fits against and is suitably secured to a flat wall of the header. Suitable ring gaskets are inserted in the recesses to seal the various passages between faucet structure body 71 and header 17. The refrigerant outlet passage 23 extends adjacent the flat wall junction of the body and the header so that the faucet structure will be maintained at a low temperature. Passages 73 in the faucet body communicate with the syrup outlet passages 65 in the header, and passage 74 in the faucet body communicates with the carbonated water outlet passage 55 in the header. Passages 65 connect with outlet tubes 75 in the nozzle and passage 74 leads directly into the nozzle. A valve 76 is arranged in each body syrup passage and a valve 77 controls carbonated water flow through passage 74. Suitable means, such as levers 78, are provided to open the syrup valves and the water valve. Operation of each valve to allow syrup flow will also open the carbonated water valve. Thus, a selected syrup and carbonated water will flow from the nozzle whenever one of the levers is lifted.

In the modified form of the invention shown in Fig. 4, provision is made for drawing off water from recess 31. Screw plug 32 is formed with a threaded projection 142 to which a water dispensing conduit (not shown) can be attached and an opening 143 extends through the plug and the projection for communication with recess 31. As the plug 32, in this form of the invention, does not carry a control member for water passing through plug 33, a metering ring 143 is provided in plug 33. The size of the ring orifice will determine the water flow through plug 33 so rings with various diameter orifices can be used to obtain different controls of the water flow. With this form of the invention both refrigerated water and charged water can be drawn from the device.

Various changes can be made in the forms of the invention herein shown and described without departing from the spirit of the invention and the scope of the appended claims.

What I claim is:

1. In a beverage dispensing apparatus, a refrigerated carbonator, means forming a chamber around the carbonator in thermal contact with the carbonator, plural tubes coiled in the chamber for receiving different flavored liquids, and outlet means connected with the carbonator and the coils.

2. In a drink dispensing apparatus, three spaced telescoped shells forming an inner and outer chamber, refrigerating means in the inner chamber, fluid in the outer chamber, a tube in the outer chamber, outlet means connected with the tube, and means for supplying a flavored liquid to the tube.

3. In a drink dispensing apparatus, an instantaneous carbonator having an interior storage chamber, a refrigerant chamber around the storage chamber, a water supply tube in the refrigerant chamber, means connecting the tube with the storage chamber including a water and carbon dioxide gas metering device, and an outlet for water leading from the connecting means between the tube and the metering device.

CARMELO V. DI PIETRO.